United States Patent
McKee et al.

(10) Patent No.: US 6,515,079 B2
(45) Date of Patent: Feb. 4, 2003

(54) PREPARATION OF THERMOPLASTIC MOLDING COMPOSITIONS

(75) Inventors: Graham Edmund McKee, Neustadt (DE); Falko Ramsteiner, Ludwigshafen (DE); Peter Barghoorn, Kallstadt (DE); Michael Breulmann, Mannheim (DE); Norbert Niessner, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 163 days.

(21) Appl. No.: 09/734,026

(22) Filed: Dec. 12, 2000

(65) Prior Publication Data

US 2001/0004659 A1 Jun. 21, 2001

(30) Foreign Application Priority Data

Dec. 16, 1999 (DE) .......................................... 199 60 855

(51) Int. Cl.$^7$ .............................. C08J 3/00; C08K 3/20; C08L 31/00; C08L 33/00; C08F 265/04
(52) U.S. Cl. ........................ 525/309; 524/458; 524/460; 525/83; 525/85; 525/86; 525/87; 525/243; 525/261; 525/310; 525/313; 525/316
(58) Field of Search ................................. 525/309, 243, 525/261, 310, 313, 316, 83, 85, 86, 87; 524/458, 460

(56) References Cited

FOREIGN PATENT DOCUMENTS

| DE | 24 27 960 | 6/1975 |
| WO | WO 99/01489 | 1/1999 |

Primary Examiner—Patrick D. Niland
(74) Attorney, Agent, or Firm—Keil & Weinkauf

(57) ABSTRACT

In a process for preparing thermoplastic molding compositions by a) polymerizing, in aqueous emulsion, dienes, $C_1$–$C_{12}$-alkyl acrylates or mixtures of these, where from 0 to 30% by weight of these monomers may have been replaced by other copolymerizable monomers, and where from 0 to 10 by weight of these monomers may have been replaced by crosslinking monomers, to give a rubber latex with a glass transition temperature below −10° C., b) agglomerating, at least to some extent, the rubber latex obtained in a), by adding, as agglomerating agent, a dispersion of a polymer made from 80 to 100% by weight of $C_1$–$C_{12}$-alkyl acrylates and from to 20% by weight of comonomers forming water-soluble polymers, where from 0 to 50% by weight of these monomers may have been replaced by other copolymerizable monomers, c) polymerizing, in aqueous emulsion, from 10 to 90 parts by weight of styrene, α-methylstyrene, (meth) acrylonitril, $C_1$–$C_{12}$-alkyl acrylate, $C_1$–$C_6$-alkyl methacrylate or mixtures of these, where up to 30% by weight of these monomers may have been replaced by other copolymerizable monomers, in the presence of from 10 to 90% by weight of the agglomerated latex obtained in b), based on the solid, to give a graft polymer, the agglomerating agent is prepared by polymerizing the monomers mentioned in b) in the presence of from 0.001 to 10% by weight of a molecular weight regulator, based on the amount of the monomers mentioned in b).

9 Claims, No Drawings

PREPARATION OF THERMOPLASTIC MOLDING COMPOSITIONS

The invention relates to a process for preparing thermoplastic molding compositions modified using a rubber.

Rubber-modified thermoplastics are used in producing a very wide variety of moldings and articles for daily use. Examples which may be mentioned are ABS (acrylonitrile-butadiene-styrene) copolymers and ASA (acrylonitrile-styrene-acrylate) copolymers. In these molding compositions use is often made of rubber particles which have been at least to some extent agglomerated.

By way of example, DE-A 24 27 960 describes processes for preparing impact-modified thermoplastic molding compositions by polymerizing butadiene or acrylates to give rubber particles and then agglomerating these by adding, to the rubber latex, an agglomerating agent based on an acrylate polymer dispersion. The agglomerated rubber latex is then grafted with styrene, acrylonitrile, methyl methacrylate or mixtures of these and, where appropriate, incorporated into a polymer matrix. An example of an agglomerating agent used is an aqueous dispersion of an ethyl acrylate copolymer built up from 96% by weight of ethyl acrylate and 4% by weight of methacrylamide.

WO 99/01489 relates to thermoplastic molding compositions with a low level of intrinsic color. The molding compositions have from 5 to 80% by weight of a graft polymer with bimodal particle size distribution. The bimodal particle size distribution is obtained by some degree of agglomeration of a rubber latex. Again, the agglomerating agents used are dispersions of copolymers, preferably copolymers of ethyl acrylate with methacrylamide. In preparing the graft polymer it is possible to use molecular weight regulators, but these cannot be used in preparing the agglomerating agent.

The known thermoplastic molding compositions have advantageous properties for use in a variety of application sectors. However, some application sectors demand that toughness values be further increased.

It is an object of the present invention to provide a process for preparing thermoplastic molding compositions leading to thermoplastic molding compositions with improved toughness values.

We have found that this object is achieved by means of a process for preparing thermoplastic molding compositions by a) polymerizing, in aqueous emulsion, dienes, $C_1$–$C_{12}$-alkyl acrylates or mixtures of these, where from 0 to 30% by weight of these monomers may have been replaced by other copolymerizable monomers, and where from 0 to 10% by weight of these monomers may have been replaced by crosslinking monomers, to give a rubber latex with a glass transition temperature below −10° C., b) agglomerating, at least to some extent, the rubber latex obtained in a), by adding, as agglomerating agent, a dispersion of a polymer made from 80 to 100% by weight of $C_1$–$C_{12}$-alkyl acrylates and from 0 to 20% by weight of comonomers forming water-soluble polymers, where from 0 to 50% by weight of these monomers may have been replaced by other copolymerizable monomers, c) polymerizing, in aqueous emulsion, from 10 to 90 parts by weight of styrene, α-methylstyrene, (meth)acrylonitrile, $C_1$–$C_{12}$-alkyl acrylate, $C_1$–$C_6$-alkyl methacrylate or mixtures of these, where up to 30% by weight of these monomers may have been replaced by other copolymerizable monomers, in the presence of from 10 to 90% by weight of the agglomerated latex obtained in b), based on the solid, to give a graft polymer, where the agglomerating agent is prepared by polymerizing the monomers mentioned in b) in the presence of from 0.001 to 10% by weight of a molecular weight regulator, based on the amount of the monomers mentioned in b).

According to the invention it has been found that the use of a molecular weight regulator during the preparation of the agglomerating agent gives the thermoplastic molding compositions prepared using this agglomerating agent better mechanical properties, in particular higher toughness values. When the agglomerating agent used according to the invention has been incorporated into the agglomerated rubber particles, these rubber particles are better able to absorb energy during deformation, for example during impact. This means that thermoplastic molding compositions comprising these rubber particles are tougher.

The average particle size in the agglomerating agent is preferably from 0.05 to 1 μm (weight average), and the particle size distribution here is monodisperse to broad. Mixtures of these agents may also be used.

The average particle size (weight average) in the latex to be agglomerated is preferably from 0.05 to 1 μm, particularly preferably below 0.3 μm, in particular below 0.2 μm. The particle size distribution may be from narrow to broad. After the agglomeration, some or all of the particles may have been agglomerated.

In a further stage d), from 5 to 70 parts by weight of the graft polymers obtained as a result of steps a), b) and c) may be blended with from 30 to 95 parts by weight of a polymer made from styrene, α-methylstyrene, methyl methacrylate, (meth)acrylonitrile or vinyl chloride, or from mixtures of these, where up to 30% by weight of these monomers may have been replaced by other copolymerizable monomers.

The individual stages are described in more detail below.

Stage a)

In the first stage a), a rubber latex is prepared in a known manner, for example as described in DE-A-24 27 960 or WO 99/01489. The specification for the base rubber uses its glass transition temperature, which should be below −10° C., preferably below −20° C. The preferred diene, butadiene, is preferably the sole monomer used. Since butadiene-acrylate rubbers are advantageous for some purposes, it is also possible to use monomer mixtures made from butadiene and acrylate and preferably comprising up to 70% by weight of acrylate, based on the mixture. Preference is given to acrylates derived from alcohols having from 1 to 8 carbon atoms, for example ethyl acrylate, butyl acrylate or ethylhexyl acrylate. In the same way it is also possible to use the acrylates alone, where appropriate together with up to 10% by weight of bifunctional, crosslinking monomers. The resultant polymers are then ASA polymers, which are weathering-resistant. Where appropriate, up to 30% by weight of other comonomers may in each case also be present during the polymerization, examples being isoprene, styrene, acrylonitrile or vinyl ethers.

The polymerization is carried out in the usual way in aqueous emulsion at from 30 to 90° C., in the presence of emulsifiers, such as the alkali metal salts of alkyl- or alkylarylsulfonates, alkyl sulfates, fatty alcohol sulfonates or fatty acids having from 10 to 30 carbon atoms. It is preferable to use salts of alkylsulfonates or fatty acids having from 12 to 18 carbon atoms. The amounts preferably used of the emulsifiers are from 0.1 to 10% by weight, in particular from 0.5 to 4.0% by weight, based on the monomers. It is preferable also to use the usual buffer salts, such as sodium carbonate and sodium pyrophosphate. In addition, use may also be made of a protective colloid in combination with the emulsifier. Examples of protective colloids are polyvinyl alcohol and polyvinylpyrrolidone.

Use is likewise made of the usual initiators, such as persulfates or organic peroxides with reducing agents, and also, where appropriate, of molecular weight regulators, such as mercaptans, terpinols or dimeric α-methylstyrene, which are added at the start of the polymerization or during its course. The ratio by weight of water to monomers is preferably from 4:1 to 3:7.

Further details may be found in the publications cited above.

Stage b)

In the second stage, the rubber latex obtained in stage a) is agglomerated. This is done by adding a dispersion of an acrylate polymer as agglomerating agent. It is preferable to use dispersion of copolymers of from 80 to 99.9% by weight acrylates of alcohols having from 1 to 4 carbon atoms, preferably of methyl acrylate or ethyl acrylate, with from 0.1 to 20% by weight of monomers forming water-soluble polymers, for example acrylic acid, methacrylic acid, acrylamide or methacrylamide, or N-methylolmethacrylamide or N-vinylpyrrolidone. The agglomerating agent may also comprise other monomers, preferably in amounts of up to 30% by weight. Examples of these monomers are styrene, acrylonitrile, dienes, such as butadiene and isoprene, derivatives of methacrylic acid, such as methyl methacrylate, and from 0.1 to 20% by weight, in particular from 2 to 15% by weight, of (meth)acrylamide and/or (meth)acrylic acid. The agglomerating dispersion may, where appropriate, also comprise two or more of the acrylate polymers mentioned.

A molecular weight regulator is used during the preparation of the agglomerating latex. Examples of suitable molecular weight regulators are as mentioned above for the preparation of the polybutadiene dispersion. It is preferable to use $C_1$–$C_{20}$ mercaptans, in particular tert-dodecyl mercaptan and ethyl mercaptan. The amount of regulator is from 0.001 to 10% by weight, preferably from 0.1 to 5% by weight, based on the monomers in the agglomerating agent (latex).

The concentration of the acrylate polymers (agglomerating latex) in the dispersion should preferably be from 3 to 70% by weight. During the agglomeration use is made of from 0.1 to 20 parts by weight, preferably from 0.2 to 5 parts by weight, of the agglomerating dispersion per 100 parts of the rubber latex, in each case based on solids. The agglomeration is carried out by adding the agglomerating dispersion to the rubber, or vice versa. It is, of course, possible for rubber latex and agglomerating latex to be mixed with one another continuously. The addition rate is normally not critical, and the addition generally takes place in from about 10 seconds to 30 minutes at from 20 to 90° C., preferably from 30 to 75° C.

Stage c)

The next step is the graft polymerization. This is again carried out in aqueous emulsion under the usual conditions listed above. It is preferable for from 10 to 90 parts by weight of styrene, acrylonitrile, methyl methacrylate or mixtures of two or of all three of these monomers to be polymerized in the presence of from 90 to 10 parts by weight of the rubber, based on the solid. The graft shell may contain up to 30% by weight of other monomers, such as acrylates and methacrylates, and N-alkyl- or N-arylmaleimide, e.g. N-phenylmaleimide. From 20 to 50% by weight of a mixture of styrene and acrylonitrile in a weight ratio of from 80:20 to 65:35 are preferably grafted onto from 50 to 80% by weight of rubber.

Stage d)

This graft polymer is hereinafter termed the soft component. It may be precipitated from the dispersion by known methods, e.g. by adding electrolytes, then isolated, dried and, where appropriate, blended with a hard polymer (hard component). However, it is also possible for the hard and soft components to be mixed in a dispersion, and precipitated and worked up. In another method, the dispersion of the soft component is only partially dewatered, and the resultant moist crumb is incorporated into a melt of the hard component, as described in DE-A 2 037 784, for example.

The hard component may be a polymer of styrene, α-methylstyrene, methyl methacrylate, acrylonitrile, methacrylonitrile, or vinyl chloride, or of a mixture of two or more of these monomers. The hard component may also contain up to 30% by weight of other monomers, such as acrylates, or N-alkyl- or N-arylmaleimides, e.g. N-phenylmaleimides. For ABS polymers it is preferable to use a copolymer of from 90 to 60% by weight of styrene and from 10 to 40% by weight of acrylonitrile. During the blending, the ratio by weight of hard component to soft component is preferably from 95:5 to 30:70. The content of the base rubber in the finished ABS molding composition is preferably from 5 to 30% by weight.

The molding compositions of the invention have an ideal balance of toughness, including toughness at low temperatures, surface luster, flowability, and thus processability as a thermoplastic.

The molding compositions may comprise the usual additives, such as fillers, other plastics, stabilizers, antistatics, plasticizers, flame retardants, lubricants, dyes and pigments, preferably in amounts which in total are about 30% of their weight. They may be processed by extrusion, thermoforming or injection molding, to give fibers, films or moldings.

The invention is described in more detail by the examples below.

EXAMPLES

Preparation of Agglomerating Dispersion

A variety of agglomerating latices were prepared by emulsion polymerization. The products differ in the amount of molecular weight regulator, tert-dodecyl mercaptan (t-DDM) used during the preparation (Table 1).

2930 g of water, 105 g of a solution of a sodium salt of the $C_{10}$–$C_{16}$ alkylsulfonic acid in water, 420 g of ethyl acrylate and 7.5 g of sodium persulfate were heated to 80° C., followed by addition, over a period of 3 h, of an emulsion made from 2240 g of water, from 180 g of methacrylamide, from 3600 g of ethyl acrylate, from 95 g of a solution of an Na salt of a $C_{10}$–$C_{16}$ alkylsulfonic acid in water, and of the amount of t-DMM specified in Table 1, and of a solution made from 260 g of water and from 6.5 g of sodium persulfate, and in turn followed by continued stirring for 2 h.

TABLE 1:

Makeup of aggolomerating latices

|    | Ethyl acrylate [% by weight] | Methacrylamide [% by weight] | t-DDM [% based on monomer] |
|----|------------------------------|------------------------------|----------------------------|
| A1 | 95.7                         | 4.3                          | 2                          |
| A2 | 95.7                         | 4.3                          | 1.5                        |

TABLE 1:-continued

Makeup of aggolomerating latices

|   | Ethyl acrylate [% by weight] | Methacrylamide [% by weight] | t-DDM [% based on monomer] |
|---|---|---|---|
| A3 | 95.7 | 4.3 | 1 |
| A4 | 95.7 | 4.3 | 0.5 |
| A5 | 95.7 | 4.3 | 0.25 |
| Comparison | 95.7 | 4.3 | — |

Preparation of Molding Compositions

A polybutadiene (pbu) dispersion with an average particle size of 85 nm was agglomerated by adding agglomerating latex (2% by weight solids, based on the polybutadiene solid), and then grafted with styrene (S) and acrylonitrile (AN). The ratio by weight SAN: pbu was 40:60 and the ratio by weight S:AN was 70:30. The agglomerating agents were the abovementioned dispersions made from 95.7% by weight of ethyl acrylate (EA) and 4.3% by weight of methacrylamide (MAM), and these had been prepared using various amounts of tert-dodecyl mercaptan as regulator.

The agglomerated and grafted dispersions were coagulated and blended with a polystyrene-acrylonitrile (PSAN) copolymer in an extruder at 260° C. The PSAN has a ratio by weight S:AN of 67:33 and a viscosity number of 80 ml/g (measured at 25° C. on a 0.5% strength solution in dimethylformamide to DIN 53726). The ratio by weight of grafted rubber to PSAN was 28:72.

These molding compositions were used to injection mold Izod specimens at 260° C. and at a mold temperature of 60° C., and measurements were made of notch impact strength (AK) as in ISO 179/1eA and impact strength (AN) to ISO 179/1eU at 23° C. and −30° C. The results are given in Table 2.

TABLE 2:

|   |   | kJ/m² | | | |
|---|---|---|---|---|---|
| Example | Latex | AN (23° C.) | AN (−30° C.) | AK (23° C.) | AK (−30° C.) |
| C1 | Comparison | 180 | 102 | 22 | 4.9 |
| 2 | A4 | 198 | 106 | n.m. | n.m. |
| 3 | A3 | 200 | n.m. | n.m. | n.m. |
| 4 | A2 1.5 | 223 | 152 | 26 | n.m. |
| 5 | A1 2.0 | 233 | 171 | 26 | 6.2 | n.m.: not measured

We claim:

1. A process for preparing thermoplastic molding compositions by
   a) polymerizing, in aqueous emulsion, dienes, $C_1$–$C_{12}$-alkyl acrylates or mixtures of these, where from 0 to 30% by weight of these monomers may have been replaced by other copolymerizable monomers, and where from 0 to 10% by weight of these monomers may have been replaced by crosslinking monomers, to give a rubber latex with a glass transition temperature below −10° C.,
   b) agglomerating, at least to some extent, the rubber latex obtained in a), by adding, as agglomerating agent, a dispersion of a polymer made from 80 to 100% by weight of $C_1$–$C_{12}$-alkyl acrylates and from 0 to 20% by weight of comonomers forming water-soluble polymers, where from 0 to 50% by weight of these monomers may have been replaced by other copolymerizable monomers,
   c) polymerizing, in aqueous emulsion, from 10 to 90 parts by weight of styrene, α-methylstyrene, (meth)acrylonitrile, $C_1$–$C_{12}$-alkyl acrylate, $C_1$–$C_6$-alkyl methacrylate or mixtures of these, where up to 30% by weight of these monomers may have been replaced by other copolymerizable monomers, in the presence of from 10 to 90% by weight of the agglomerated latex obtained in b), based on the solid, to give a graft polymer, which comprises preparing the agglomerating agent by polymerizing the monomers mentioned in b) in the presence of from 0.001 to 10% by weight of a molecular weight regulator, based on the amount of the monomers mentioned in b).

2. A process as claimed in claim 1, wherein
   d) from 5 to 70 parts by weight of the graft polymer obtained in c) are blended with from 30 to 95 parts by weight of a polymer made from styrene, α-methylstyrene, methyl methacrylate, (meth)acrylonitrile or vinyl chloride, or from mixtures of these, where up to 30% by weight of these monomers may have been replaced by other copolymerizable monomers.

3. A process as claimed in claim 1, wherein the molecular weight regulator has been selected from $C_1$–$C_{20}$ mercaptans and mixtures of these.

4. A process as claimed in claims 1, wherein the agglomerating agent is a copolymer made from 80 to 99.9% by weight of $C_{1-C4}$-alkyl acrylates and 0.1 to 20% by weight of (meth)acrylamide or (meth)acrylic acid.

5. A process as claimed in claim 1, wherein the amount of the agglomerating agent used is from 0.1 to 20 parts by weight per 100 parts by weight of rubber latex, based on the solids.

6. A process as claimed in claim 1, wherein, in stage a), the rubber has been built up from 30 to 100% by weight of butadiene and from 0 to 70% by weight of $C_1$–$C_8$-alkyl acrylates.

7. A process as claimed in claim 1, wherein, in stage c), use is made of a mixture made from styrene and acrylonitrile in a ratio by weight of from 80:20 to 65:35.

8. A molding composition obtained by the process defined in claim 1.

9. A fiber, film or a molding made from the molding composition defined in claim 8.

* * * * *

UNITED STATES PATENT AND TRADEMARK OFFICE
CERTIFICATE OF CORRECTION

PATENT NO. : 6,515,079 B2
DATED : February 4, 2003
INVENTOR(S) : McKee et al.

It is certified that error appears in the above-identified patent and that said Letters Patent is hereby corrected as shown below:

Title page,
Item [57], ABSTRACT,
Line 7, "0 to 10 by" should read -- 0 to 10% by --;
Line 14, "from to 20%" should be -- from 0 to 20% --.

Column 6,
Line 35, "$C_{1-C4}$-alkyl" should be -- $C_{1-4}$-alkyl --.

Signed and Sealed this

Twenty-fifth Day of March, 2003

JAMES E. ROGAN
*Director of the United States Patent and Trademark Office*